(12) United States Patent
Yamaguchi

(10) Patent No.: US 6,505,798 B1
(45) Date of Patent: Jan. 14, 2003

(54) DRAG MECHANISM FOR TRIPOD HEAD

(75) Inventor: Minoru Yamaguchi, Saitama (JP)

(73) Assignee: Heiwa Seiki Kogyo Co., Ltd., Yashio (JP)

(*) Notice: Subject to any disclaimer, the term of this patent is extended or adjusted under 35 U.S.C. 154(b) by 63 days.

(21) Appl. No.: 09/712,157

(22) Filed: Nov. 15, 2000

(30) Foreign Application Priority Data

Nov. 17, 1999 (JP) .................................. 11-327382

(51) Int. Cl.$^7$ ................................................ F16M 11/02
(52) U.S. Cl. .......................... 248/178.1; 248/183.1; 352/243
(58) Field of Search ........................... 248/177.1, 178.1, 248/183.1, 82, 84, 86, 88, 514; 192/58.4, 58.41, 58.42, 58.43; 352/243

(56) References Cited

U.S. PATENT DOCUMENTS

| | | | |
|---|---|---|---|
| 2,064,103 A | * 12/1936 | Burdick | 188/329 |
| 2,394,384 A | * 2/1946 | Horstmann | 192/48.3 |
| 3,599,510 A | * 8/1971 | Scott et al. | 192/79 |
| 3,822,769 A | * 7/1974 | O'Connor | 188/290 |
| 4,154,321 A | * 5/1979 | Falk | 188/71.9 |
| 4,653,709 A | * 3/1987 | Paldino | 248/183.2 |
| 4,811,821 A | * 3/1989 | Wrench | 188/329 |
| 4,813,516 A | * 3/1989 | Urban | 188/264 B |
| 4,919,239 A | * 4/1990 | Urban | 188/216 |
| 5,092,433 A | * 3/1992 | Endo | 188/290 |
| 5,316,115 A | * 5/1994 | Urban | 188/325 |
| 5,540,408 A | * 7/1996 | Ishikawa | 188/322.5 |
| 5,553,821 A | * 9/1996 | Ishikawa | 248/185.1 |

FOREIGN PATENT DOCUMENTS

| | | | |
|---|---|---|---|
| EP | 677693 A1 | * 10/1995 | F16M/11/06 |
| JP | 7-21996 | 5/1995 | |
| JP | 0728015 A | * 10/1995 | F16M/11/06 |

* cited by examiner

*Primary Examiner*—Kimberly Wood
*Assistant Examiner*—Naschica S. Morrison
(74) *Attorney, Agent, or Firm*—Wenderoth, Lind & Ponack, L.L.P.

(57) ABSTRACT

A circular-plate holder is disposed at an end of a cylindrical portion arranged in a tripod head. A pair of arc lever tumblers, which is capable of contacting the inner surface of the cylindrical portion, is rotatably supported on the holder around a rotation axis. The ends of the arc lever tumblers are close to each other. A rotator, which has a gear portion at a tip end, is rotatably supported on the holder around a rotation axis disposed between the other ends of the lever tumblers. Each of the tumblers is connected to the rotator by a pair of linkage means. The gear portion of the rotator engages a gear portion of a torque-adjusting shaft, which extends through a central portion of the holder and rotates according to rotational operation of an adjusting knob.

16 Claims, 4 Drawing Sheets

DRAG MECHANISM FOR TRIPOD HEAD

BACKGROUND OF THE INVENTION

1. Field of the Invention

The present invention relates to a drag mechanism for a tripod head. More particularly, the present invention relates to a drag mechanism for a tripod head that is particularly excellent with regard to a torque adjusting function, i.e., adjusting torque to an appropriate level for tilting and panning operations.

2. Description of the Prior Art

In several tripod heads for tilting and panning a camera as well as mounting a camera on a tripod, the tripod heads are provided with a drag mechanism capable of generating and adjusting torque in order to adequately pursue a moving objective and enhance the operational feelings of a cameraman.

A drag mechanism that employs brake shoes is well known. In this type of drag mechanism, a pair of arc brake shoes is provided and torque is generated by contacting each of the brake shoes to an inner surface of a cylindrical portion arranged in a tripod head. Increasing and decreasing the contact area of a brake shoe with the inner surface realizes torque adjustment. That is, increasing the contact area of a brake shoe enlarges the torque; on the other hand, the torque is reduced as the contact area decreases.

Japan Utility Model Publication No. 21996/1995 has proposed an improvement such as magnification of the adjustable torque amount by expanding the contact area of a brake shoe. The improvement, however, follows such a manner of adjusting torque as described above.

In the improved drag mechanism, a slider having a tapered face is inserted and extracted between ends of a pair of brake shoes. The insertion causes the brake shoes to move toward an inner surface of a cylindrical portion and the extraction causes the brake shoes to be removed from the inner surface to change the contact area.

Though the manner adopting such a slider has merit in that the mechanism is not complicated, the manner is poor with regard to fine torque adjustment, and thus, the torque adjustment is not reliable.

SUMMARY OF THE INVENTION

The present invention has an object of solving defects of the conventional drag mechanism and to provide a drag mechanism for a tripod head that is particularly excellent in a torque adjusting function, i.e., adjusting torque to the appropriate level that is needed for tilting and panning operations.

This and other objects, features and advantages of the invention will become more apparent upon a reading of the following detailed description and drawings, in which:

DETAILED DESCRIPTION OF THE INVENTION

The present invention provides, as a means for solving the problems in the prior art, a drag mechanism for a tripod head, including a circular-plate holder disposed at an end of a cylindrical portion arranged in a tripod head.

A pair of arc lever tumblers are rotatably mounted on the holder around a rotation axis disposed at an end, the ends of which are close to each other. The lever tumblers are contactable with an inner surface of the cylindrical portion.

The drag mechanism also includes a rotator having an arc gear portion at a tip end. The rotator is rotatable on the holder around a rotation axis disposed between the other ends of the pair of lever tumblers.

A pair of linkage means are provided for connecting each of the lever tumblers to the rotator.

Also, the drag mechanism has a torque-adjusting shaft having a gear portion engaging the arc gear portion of the rotator. The torque-adjusting shaft pierces a central portion of the holder and is rotated by rotational operation of an adjusting knob that is rotatably mounted on a surface of the tripod head.

The present invention provides, as one of preferred modes, a drag mechanism in which timing, when each of the lever tumblers touches the inner surface of the cylindrical portion, is varied. In this mode, the present invention provides a more preferable mode in which the shortest distance from the rotation axis to a connecting portion of a linkage means is different between the pair of lever tumblers or the shortest distance from a connecting portion of a lever tumbler to a connecting portion of the rotator is different between the pair of linkage means.

In those drag mechanisms mentioned above, the present invention further provides a more preferable mode in which the lever tumblers are made of metal and have a thin shape and elasticity or a circular click plate on which a plurality of small holes are concentrically disposed with a constant spacing is fixed to the torque-adjusting shaft and a ball plunger, which is capable of both engaging and releasing from any one of the holes is fixed to the holder.

Now, a drag mechanism for a tripod head of the present invention will be described in more detail in accordance with the drawings.

Figure 1:
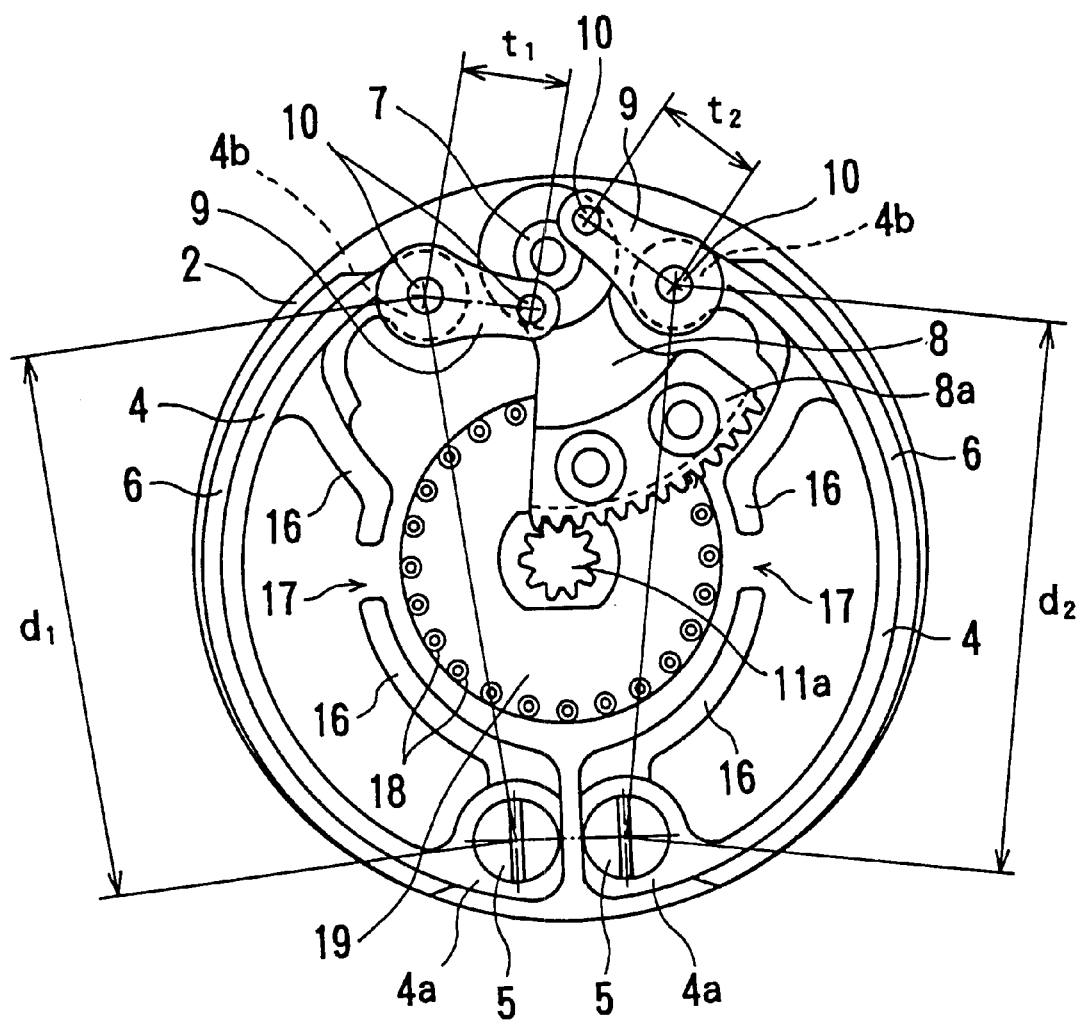
FIG. 1 is a plan view depicting an embodiment of a drag mechanism of a tripod head of the present invention.
Figure 2:
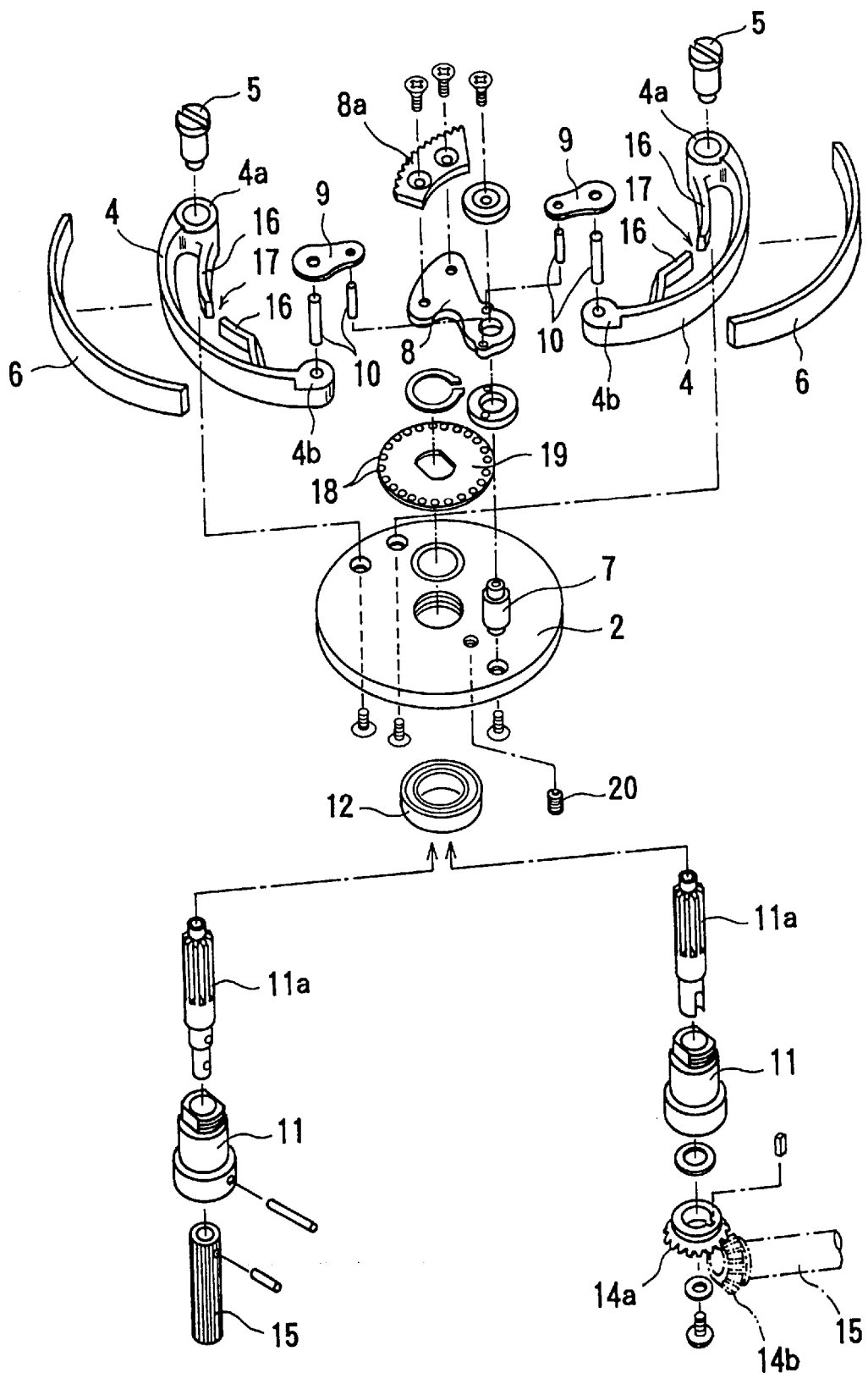
FIG. 2 is an exploded perspective view of the embodiment shown in FIG. 1.
Figure 3:
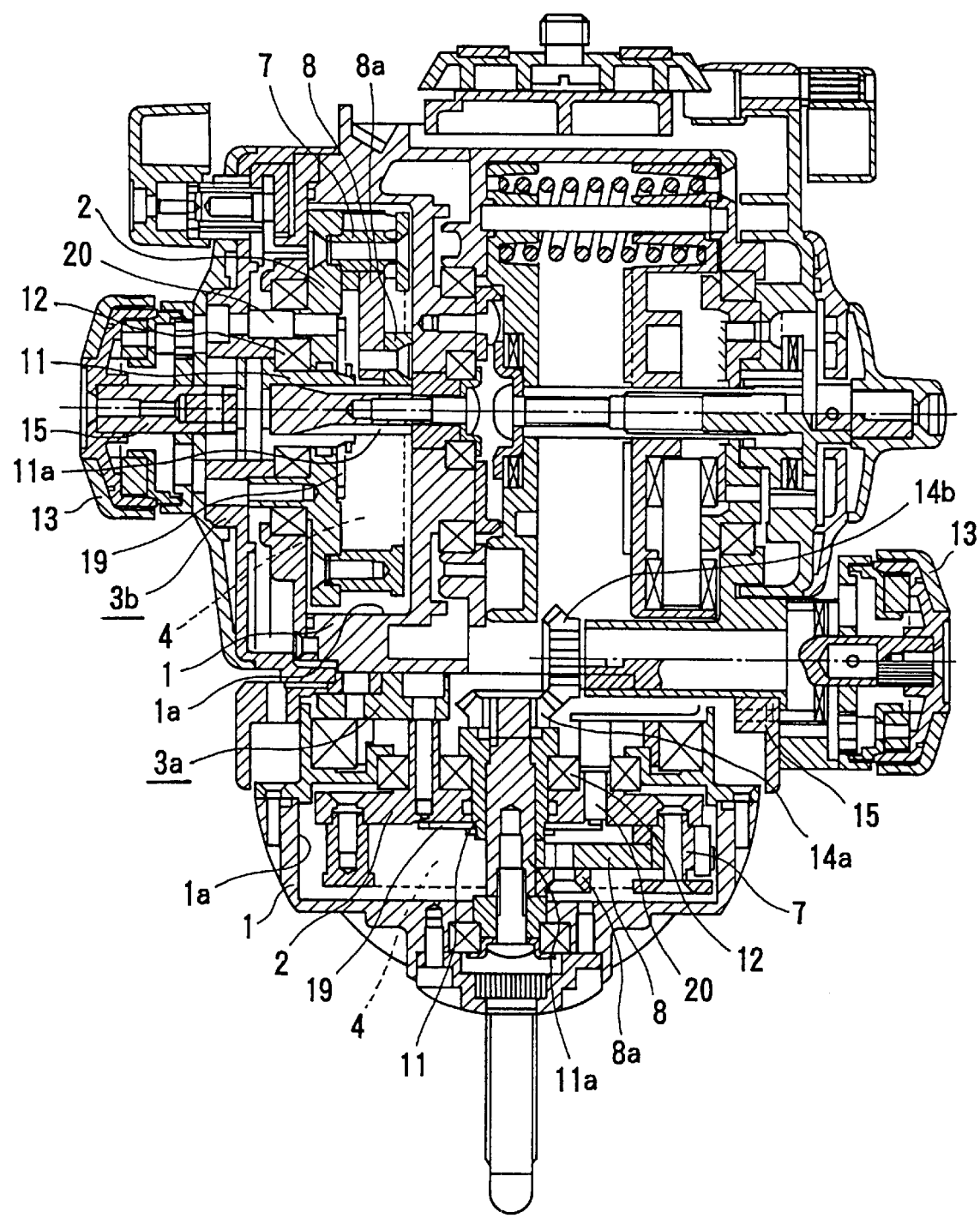
FIG. 3 is a sectional view of an embodiment of a tripod head incorporated with the drag mechanism of the present invention.

As shown in FIGS. 1 to 3, for example, a circular-plate holder (2) is disposed at an end of a cylindrical portion (1) arranged in a tripod head. Both panning section (3a) and tilting section (3b), which are arranged in the tripod head, are provided with the cylindrical portion (1).

A pair of arc lever tumblers (4) is rotatably supported on the holder (2). A rotation axis or shaft (5) is disposed at an end (4a) of each of the lever tumblers (4). The ends (4a) of the tumblers are disposed closely to each other. Both of the lever tumblers (4) are capable of contacting an inner surface (1a) of the cylindrical portion (1). In more detail, a surface of the lever tumbler (4) can contact the inner surface (1a) of the cylindrical portion (1). In consideration of abrasion and contact properties, a contact tip (6) made of cork, for example, can be provided on the surface of the lever tumblers (4). The other ends (4b) of the pair of lever tumblers (4) are connected to a rotator (8) through a pair of linkage means (9). The rotator (8) is rotatably supported on the holder (2) and a rotation axis or shaft (7) of the rotator (8) is disposed between the ends (4b) of the pair of lever tumblers (4). A roller pin (10), for example, can be used for connection of the linkage means (9), the end (4b) and the rotator (8).

The rotator (8) has an arc gear portion (8a) at a tip end thereof. The gear portion (8a) may be integral with a main body of the rotator (8) or it may be separate therefrom. When separation is adopted, as shown in drawings, the gear portion (8a) can be screwed on the tip end of a main body of the rotator (8). The gear portion (8a) engages a gear portion (11a) of a torque-adjusting shaft (11) that extends through a central portion of the holder (2).

The torque-adjusting shaft (11) is rotatable, for example, by a bearing (12) mounted around the torque-adjusting shaft (11). The torque-adjusting shaft (11) can be rotated by rotational operation of an adjusting knob (13), which is rotatably mounted on a surface of the tripod head. For example, the torque-adjusting shaft (11) can be connected to a rotation shaft (15) of the adjusting knob (13) through a pair of bevel gears (14a, 14b) in a drag mechanism for panning. On the other hand, the torque-adjusting shaft (11) can be directly connected to the rotation shaft (15) of the adjusting knob (13) in a drag mechanism for tilting. Because of such connection to rotation shaft (15) as mentioned above, rotation of the torque-adjusting shaft (11) is effected by rotational operation of the adjusting knob (13).

Figure 4A:
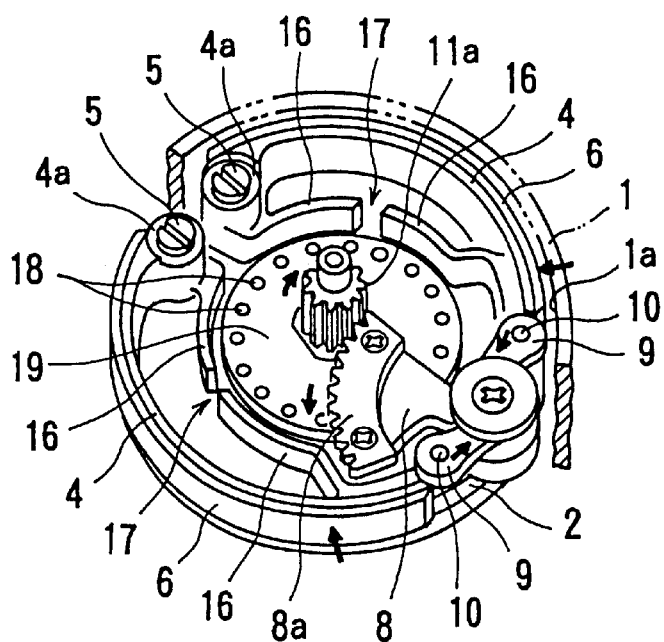
FIGS. 4a and 4b are perspective views depicting a state of torque adjustment by the drag mechanism for a tripod head of the present invention as shown in FIGS. 1 to 3.

In the drag mechanism both for panning and tilting of the present invention, which has such a structure as mentioned above, the torque-adjusting shaft (11) is rotated according to torque imparted by rotational operation of the adjusting knob (13). When the gear portion (11a) is rotated, for example, in an arrow direction as shown in FIG. 4a, the gear portion (8a), which engages the gear portion (11a), is rotated in a direction indicated by the arrow as shown in the same figure. According to the rotation, the pair of linkage means (9) moves so as to decrease the distance between the ends (4b) of the pair of lever tumblers (4). Then, the pair of lever tumblers (4) is rotated so as to leave the inner surface (1a) of the cylindrical portion (1). As a result of this movement, the contact area between the pair of lever tumblers (4) and the inner surface (1a) of the cylindrical portion (1) decreases and the torque needed for panning or tilting decreases. In the case of panning, the holder (2) disposed at an end of the cylindrical portion (1) arranged in the panning section (3a) is rotated together with the panning section (3a) and the pair of lever tumblers (4) relative to the inner surface (1a) of the cylindrical portion (1) so as to slide along the inner surface (1a) with the adjusted contact. Since the torque-adjusting shaft (11) does not rotate with the holder (2), the adjusted torque is constantly maintained. In the case of tilting, the holder (2) positioned at an end of the cylindrical portion (1) arranged in the tilting section (3b) is not rotated. On the other hand, the cylindrical portion (1) rotates and therefore the pair of lever tumblers (4) slides along the inner surface (1a) of the cylindrical portion (1) with the adjusted contact. In this case, since the torque-adjusting shaft (11) does not rotate relative to the holder (2), the adjusted torque is constantly maintained.

Figure 4B:
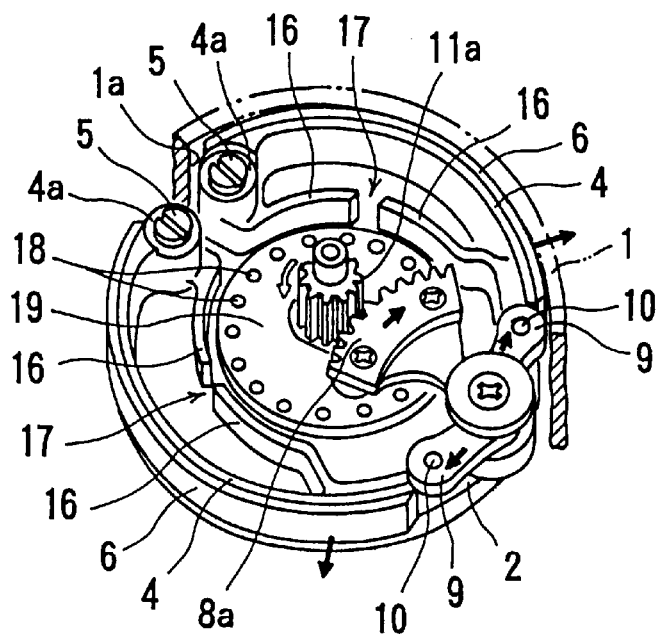

When the gear portion (11a) is rotated in an arrow direction as shown FIG. 4b, which is an opposite direction relative to the direction shown in FIG. 4a, the rotation direction of the gear portion (8a) is also opposite to one that is shown in FIG. 4a. The pair of linkage means (9) moves so as to expand the distance between the ends (4b) of the pair of lever tumblers (4). As a result, the pair of lever tumblers (4) rotates toward the inner surface (1a) of the cylindrical portion (1) and since the contact area is enlarged, torque increases. Operation in panning or tilting is similar to that mentioned above and the adjusted torque is constantly maintained.

As described above, in the drag mechanism for a tripod head of the present invention, increase and decrease of contact area between the pair of lever tumblers (4) and the inner surface (1a) of the cylindrical portion (1) arranged in a tripod head is realized by the rotator (8) connected to the torque-adjusting shaft (11), which is rotated by rotational operation of the adjusting knob (13), and the pair of linkage means (9) connecting the rotator (8) to the pair of lever tumblers (4). As compared with the conventional drag mechanism, which employs the slider, rotational operation of the adjusting knob (13) effects the rotation of the pair of lever tumblers (4) and fine adjustment of torque is enabled. Reliability of torque adjustment is improved and therefore the defects mentioned above with respect to the conventional drag mechanism for a tripod head are solved.

With respect to the drag mechanism of the present invention, in order to expand a range of torque adjustment as well as to enhance sensitivity of torque adjustment, the timing when each of the lever tumblers (4) touches the inner surface (1a) of the cylindrical portion (1) is varied. When contact timing of one of the lever tumblers (4) is earlier than contact timing of the other, total variation of contact area is enlarged as compared with concurrent contact of the pair of lever tumblers (4). As a result, finer torque adjustment is enabled and the range of torque adjustment is expanded.

As a means for varying contact timing to the inner surface (1a) of the cylindrical portion (1) between the pair of lever tumblers (4), it is exemplified that, as shown in FIG. 1, the shortest distances ($d_1$, $d_2$) from the rotation axis (5) positioned at the end (4a) to a connecting portion of a linkage means (9) at the end (4b), i.e., the roller pin (10), are different between the pair of lever tumblers (4). It is also exemplified that the shortest distances ($t_1$, $t_2$) from a connecting portion of the lever tumbler (4) to a connecting portion of the rotator (8), i.e., the shortest distance between a pair of roller pins (10), are different between the pair of linkage means (9).

With respect to the drag mechanism of a tripod head of the present invention, both enhancement of sensitivity of torque adjustment and expansion of the range of torque adjustment are realized by the lever tumblers (4) which are made of metal and have a thin shape, as shown in the drawings, and elasticity. The lever tumblers (4) can be bent along the inner surface (1a) of the cylindrical portion (1) arranged in a tripod head. This guarantees both preferable contact with and retraction from the inner surface (1a). Consequently, sensitivity of torque adjustment is improved and the range of torque adjustment is expanded.

It is possible that a reinforcing tip (16) can be provided with the pair of lever tumblers (4) at a rear side, i.e., at an opposite side to the side where the contact tip (6) is provided. In this case, however, it is preferable that a notch (17) is formed at the middle of the reinforcing tip (16) in order to maintain the elasticity of the lever tumblers (4), which are formed of metal and have a thin shape.

With respect to the drag mechanism for a tripod head of the present invention, it is also possible to fix a circular click plate (19), on which a plurality of small holes (18) are concentrically disposed with a constant spacing, to the torque adjusting shaft (11), and to fix a ball plunger (20), capable of both engaging and releasing from any one of the holes (18), to the holder (2) in order to suppress back rotation of the lever tumblers (4) and to adequately maintain a constant adjusted torque. Since the click plate (19) is fixed to the torque-adjusting shaft (11), the click plate (19) rotates together with the torque-adjusting shaft (11) when the torque-adjusting shaft (11) is rotated by rotational operation of the adjusting knob (13) for adjusting torque. On the other hand, since the ball plunger (20) is fixed to the holder (2), the ball plunger (20) engages and releases from each of holes (18) according to the rotation of the click plate (19) and when the rotation of the click plate (19) is stopped, the ball plunger (20) engages one of the holes (18). The engagement holds both the torque-adjusting shaft (11) and the rotator (8) having the gear portion (8a) engaging the gear portion (11a) of the torque-adjusting shaft (11). As a result, back rotation of the lever tumblers (4) is suppressed and the adjusted torque is adequately maintained.

It is not necessary that the small holes (18) pass through the click plate (19). It is possible that the holes (18) are concavities that the ball plunger (20) can engage and release from.

The present invention is not restricted to embodiments mentioned above. It is needless to mention that various modes may be possible with respect to size, shape and structure of the rotator, the linkage means, the torque-adjusting shaft as well as the lever tumblers.

What is claimed is:

1. A drag mechanism for a tripod head, said drag mechanism comprising:
   a cylindrical portion arranged in the tripod head;
   a circular-plate holder disposed at an end of said cylindrical portion;
   a pair of arc lever tumblers rotatably supported on said circular-plate holder, said arc lever tumblers being engagable with an inner surface of said cylindrical portion, wherein each of said arc lever tumblers has a first end and a second end, and each of said arc lever tumblers is rotatable about a rotation axis located at its first end, and the first ends of said arc lever tumblers are located close to each other;
   a rotator rotatably supported on said circular-plate holder, said rotator having an arc gear portion, wherein said rotator is rotatable about a rotation axis located between the second ends of said arc lever tumblers;
   a first linking device connecting the second end of one of said arc lever tumblers to said rotator;
   a second linking device connecting the second end of the other of said arc lever tumblers to said rotator; and
   a torque-adjusting shaft extending through a central portion of said circular-plate holder, said torque-adjusting shaft having a gear portion engaging said arc gear portion of said rotator, wherein said torque-adjusting shaft can be rotated by rotational operation of an adjusting knob rotatably mounted on a surface of the tripod head.

2. The drag mechanism as claimed in claim 1, wherein a timing when each of said arc lever tumblers contacts the inner surface of the cylindrical portion can be varied.

3. The drag mechanism as claimed in claim 2, wherein a shortest distance between the rotation axis of one of said arc lever tumblers and a connecting portion of the second end of said one of said arc lever tumblers and said first linking device is different than a shortest distance between the rotation axis of the other of said arc lever tumblers and a connecting portion of the second end of said other of said arc lever tumblers and said second linking device.

4. The drag mechanism as claimed in claim 2, wherein a shortest distance between a connecting portion of said first linking device to its corresponding arc lever tumbler and a connecting portion of said first linking device to said rotator is different than a shortest distance between a connecting portion of said second linking device to its corresponding arc lever tumbler and a connecting portion of said second linking device to said rotator.

5. The drag mechanism as claimed in claim 1, wherein said arc lever tumblers are formed of metal and have a thin shape, and said arc lever tumblers are elastic.

6. The drag mechanism as claimed in claim 2, wherein said arc lever tumblers are formed of metal and have a thin shape, and said arc lever tumblers are elastic.

7. The drag mechanism as claimed in claim 3, wherein said arc lever tumblers are formed of metal and have a thin shape, and said arc lever tumblers are elastic.

8. The drag mechanism as claimed in claim 4, wherein said arc lever tumblers are formed of metal and have a thin shape, and said arc lever tumblers are elastic.

9. The drag mechanism as claimed in claim 1, further comprising:
   a circular click plate fixed to said torque-adjusting shaft, said circular click plate having a plurality of small holes that are uniformly spaced about a center portion of said circular click plate; and
   a ball plunger fixed to said circular-plate holder, said ball plunger being capable of both engaging and releasing from any one of said holes.

10. The drag mechanism as claimed in claim 2, further comprising:
    a circular click plate fixed to said torque-adjusting shaft, said circular click plate having a plurality of small holes that are uniformly spaced about a center portion of said circular click plate; and
    a ball plunger fixed to said circular-plate holder, said ball plunger being capable of both engaging and releasing from any one of said holes.

11. The drag mechanism as claimed in claim 3, further comprising:
    a circular click plate fixed to said torque-adjusting shaft, said circular click plate having a plurality of small holes that are uniformly spaced about a center portion of said circular click plate; and
    a ball plunger fixed to said circular-plate holder, said ball plunger being capable of both engaging and releasing from any one of said holes.

12. The drag mechanism as claimed in claim 4, further comprising:
    a circular click plate fixed to said torque-adjusting shaft, said circular click plate having a plurality of small holes that are uniformly spaced about a center portion of said circular click plate; and
    a ball plunger fixed to said circular-plate holder, said ball plunger being capable of both engaging and releasing from any one of said holes.

13. The drag mechanism as claimed in claim 5, further comprising:
    a circular click plate fixed to said torque-adjusting shaft, said circular click plate having a plurality of small holes that are uniformly spaced about a center portion of said circular click plate; and
    a ball plunger fixed to said circular-plate holder, said ball plunger being capable of both engaging and releasing from any one of said holes.

14. The drag mechanism as claimed in claim 6, further comprising:
    a circular click plate fixed to said torque-adjusting shaft, said circular click plate having a plurality of small holes that are uniformly spaced about a center portion of said circular click plate; and a ball plunger fixed to said circular-plate holder, said ball plunger being capable of both engaging and releasing from any one of said holes.

15. The drag mechanism as claimed in claim 7, further comprising:

a circular click plate fixed to said torque-adjusting shaft, said circular click plate having a plurality of small holes that are uniformly spaced about a center portion of said circular click plate; and a ball plunger fixed to said circular-plate holder, said ball plunger being capable of both engaging and releasing from any one of said holes.

16. The drag mechanism as claimed in claim 8, further comprising:

a circular click plate fixed to said torque-adjusting shaft, said circular click plate having a plurality of small holes that are uniformly spaced about a center portion of said circular click plate; and a ball plunger fixed to said circular-plate holder, said ball plunger being capable of both engaging and releasing from any one of said holes.

* * * * *